United States Patent
Johnson et al.

(10) Patent No.: US 10,152,768 B2
(45) Date of Patent: Dec. 11, 2018

(54) ARTIFACT REDUCTION FOR IMAGE STYLE TRANSFER

(71) Applicant: Facebook, Inc., Menlo Park, CA (US)

(72) Inventors: Justin Johnson, Seattle, WA (US);
Peter Vajda, Palo Alto, CA (US);
Yangqing Jia, Sunnyvale, CA (US);
Tommer Leyvand, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/488,424

(22) Filed: Apr. 14, 2017

(65) Prior Publication Data

US 2018/0300850 A1 Oct. 18, 2018

(51) Int. Cl.
*G06K 9/20* (2006.01)
*G06K 9/36* (2006.01)
*G06T 3/00* (2006.01)
*G06T 5/50* (2006.01)
*G06N 3/08* (2006.01)

(52) U.S. Cl.
CPC .............. *G06T 3/0093* (2013.01); *G06N 3/08* (2013.01); *G06T 5/50* (2013.01)

(58) Field of Classification Search
CPC ........... G06T 3/0093; G06T 5/50; G06N 3/08; G06N 3/02; G06K 9/66; G06K 9/68
See application file for complete search history.

(56) References Cited

U.S. PATENT DOCUMENTS

| | | | | |
|---|---|---|---|---|
| 7,738,725 B2 * | 6/2010 | Raskar | ..................... | G06T 15/02 382/199 |
| 8,766,985 B1 * | 7/2014 | Kass | ....................... | G06T 13/00 345/473 |
| 2016/0364625 A1 * | 12/2016 | Lin | ........................... | G06T 7/60 |

OTHER PUBLICATIONS

Johnson, J. et al., "Perceptual Losses for Real-Time Style Transfer and Super-Resolution", Stanford University, Mar. 27, 2016, 18 pages.

\* cited by examiner

*Primary Examiner* — Samir Ahmed
(74) *Attorney, Agent, or Firm* — Fenwick & West LLP

(57) ABSTRACT

An image processing system transforms content images into the style of another reference style image. For example, the system applies a noise mask to generate noisy versions of the content images. The system then recomposes a content image in the style of a reference image by applying computer models to the noisy version of the content image, which reduces artifacts in the stylized image compared to that of a stylized image generated by applying the computer models to the original content image. When the content images are part of a video sequence, the image processing system may adjust the noise mask applied in a subsequent frame such that it tracks the movement of the client device from the current frame to the subsequent frame. This allows the system to reduce artifacts while stylizing the frames of the video in a consistent manner.

14 Claims, 5 Drawing Sheets

ARTIFACT REDUCTION FOR IMAGE STYLE TRANSFER

BACKGROUND

This invention relates generally to transforming images, and more particularly to transforming images in the style of other images.

Style transfer recomposes content images in the style of one or more reference style images. For example, a photograph of a house can be recomposed into the unique style of artists such as Vincent van Gogh or Claude Monet. Specifically, a content image can be recomposed in the style of the reference image by applying image transformation models to the content image to generate a stylized image. The stylized image preserves high-level spatial features of the content image while incorporating stylistic features of the reference image, such as texture, color palette, length and curvature of brushstrokes, and the like. For example, a stylized image of the house in the style of "The Starry Night" of Vincent van Gogh may preserve the high-level structures of the house, such as the roof, exterior walls, and large windows, while incorporating the predominantly blue color palette and the distinct brushwork of the artist.

By using computer models, content images can be recast in a variety of different styles in a relatively short amount of time without the need for creating the stylized image from scratch. However, many computer models for style transfer introduce undesired artifacts in the stylized image due to high non-linearity of image transformation models.

SUMMARY

Embodiments of the invention transform content images into the style of one or more reference style images. For example, an image processing system applies a noise mask to content images to generate noisy versions of the content images. The system recomposes a content image in the style of one or more reference images by applying computer models to the noisy version of the content image. Applying the computer models to the noisy version of the content image reduces artifacts in the stylized image compared to that of a stylized image generated by applying the computer models to the original content image.

Specifically, the image processing system receives content images from a client device. The system also receives a request to stylize the content images in the style of one or more reference images. The content images may be individual images, or may be part of a video sequence of frames. The image processing system applies a noise mask to a content image to generate a noisy version of the content image. One or more image transformation models are applied to the noisy version of the content image to generate the stylized image. Applying the noise mask especially helps reduce artifacts in flat regions of images that are groups of contiguous pixels having similar color and/or patterns. For example, flat regions may be segments of walls, sky, and grass in an image.

In one embodiment, when the content images are part of a video sequence, the system generates noisy versions of the frames of the video sequence, and generates the stylized video by applying the image transformation models to the noisy frames. Given a noise mask applied in a current frame, the image processing system may adjust the noise mask applied in a subsequent frame such that it tracks the movement of the client device from the current frame to the subsequent frame. This allows the image processing system to apply same noise mask patterns to portions of the current frame and the subsequent frame that include partially overlapping regions of the scene. Consequently, the image processing system can reduce irregularities in flat regions while stylizing the images in a consistent manner throughout the video sequence. In one embodiment, the noise mask may be adjusted by applying one or more geometric transformations (e.g., translation, rotation, reflection) to pixel values of the noise mask.

For example, a user may capture a video of a room with a flat region corresponding to a smooth wall, in which the user rotates the camera around the room. The image processing system may stylize a frame in the video sequence by applying a noise mask, and applying the image transformation models to the current frame. When the camera has been rotated 5 degrees to the left in a subsequent frame, pixel values of the noise mask for the subsequent frame may be translated 5 degrees to the right, such that same patterns of the noise mask are applied to portions of the current frame and portions of the subsequent frame that include overlapping views of the dark wall.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
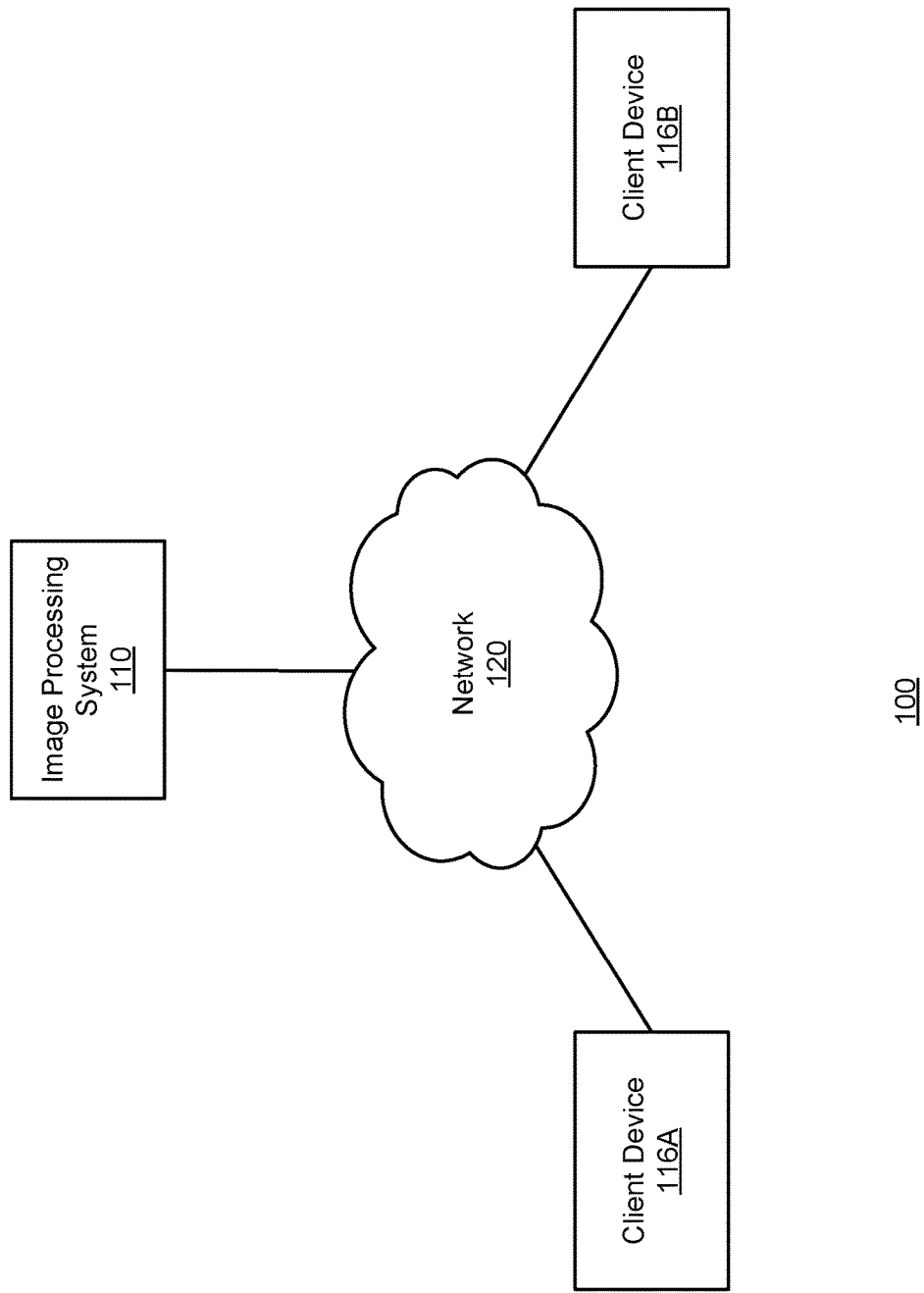
FIG. 1 is a high level block diagram of a system environment for an image processing system, in accordance with an embodiment.

FIG. 1 is a high level block diagram of a system environment for an image processing system, in accordance with an embodiment. The system environment 100 shown by FIG. 1 comprises one or more client devices 116A, 116B, a network 120, and the image processing system 110. In alternative configurations, different and/or additional components may be included in the system environment 100. The embodiments described herein can be adapted to online systems that are not social networking systems, such as advertising systems or ad publishing systems.

The client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120. In one embodiment, a client device 116 executes an application allowing a user of the client device 116 to interact with the image processing system 110. For example, a client device 116 executes a browser application to enable interaction between the client device 116 and the image processing system 110 via the network 120. In another embodiment, the client device 116 interacts with the image processing system 110 through an application programming interface (API) running on a native operating system of the client device 116, such as IOS® or ANDROID™.

The client devices 116 provide content images to the image processing system 110 and requests stylization of the content images in the style of one or more reference images. The content images may be individual images, or a video sequence of images in which each content image corresponds to a frame in the video sequence. For example, a photograph of a house can be recomposed into styles of artwork drawn by artists such as Vincent van Gogh or Claude Monet. The stylized image preserves high-level spatial features of the content image while incorporating stylistic features of the reference image. For example, a stylized image of the house in the style of "The Starry Night" of Vincent van Gogh may preserve the overall spatial structure of the house, such as the roof, exterior walls, and large windows, while incorporating the predominantly blue color palette and the distinct brushwork style of the artist.

In one embodiment, users of client devices 116 may select the reference images used for styling the content image. For example, users may select locally stored reference images in the client device 116A, and provide the selected reference images to the image processing system 110. In another embodiment, users of client device 116 may select reference images from a set of options supported by the image processing system 110. For example, users may select a reference style image from a set of images supported and displayed by the image processing system 110. As another example, users may select from a set of artists displayed by the image processing system 110 that are each associated with corresponding set of reference images.

The client devices 116 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The image processing system 110 receives requests from client devices 116 to recompose content images in the style of one or more reference images. The image processing system 110 generates stylized images by applying image transformation models to the content images. Specifically, the image transformation models are computer models that recast the high-level spatial features of a content image using stylistic features of one or more reference images to generate the stylized image. The image transformation models may capture stylistic features such as texture, color palette, length and curvature of brushstrokes, and edge texture of the reference images. When the content images are a video sequence, the image processing system 110 may apply the image transformation models to each frame of the sequence to generate a stylized version of the video.

In one embodiment, the request from the client device 116 includes a selection of a reference image by the user of the device 116 from among a predetermined set of reference images supported by the image processing system 110. In such an instance, the image processing system 110 applies a pre-trained image transformation model associated with the reference image to the content image to generate the stylized image. In another embodiment, the request from the client device 116 includes a desired reference image along with the content image for stylization. In such an instance, the image processing system 110 may train an image transformation model associated with the reference image responsive to receiving the request. The trained model is then applied to the content image to generate the stylized image.

By using computer models for stylization, images can be recast in a variety of different styles in a relatively short amount of time without re-drawing the stylized image from scratch. However, image transformation models can also introduce undesired artifacts in the stylized image due to the high non-linearity of the models. Artifacts may be especially pronounced in portions of stylized images corresponding to flat regions. Flat regions are groups of contiguous pixels in an image that have similar color and/or patterns. For example, regions in an image corresponding to smooth walls, the sky, and grass may be represented as flat regions. In particular, image transformation models may amplify small differences in pixel values of flat regions resulting in irregularities in the stylized image. For example, even small differences in pixel values for a smooth wall between two successive frames can be amplified when the video is stylized by the models, resulting in significantly different stylizations of the wall between the two frames.

In one embodiment, the image processing system 110 applies the image transformation models to a noisy version of the content image to reduce artifacts in the stylized image. Specifically, the image processing system 110 applies a noise mask to a content image to generate a noisy version of the content image. The image transformation models are applied to the noisy version of the content image to generate the stylized image. Applying the noise mask particularly helps reduce artifacts in flat regions.

In one embodiment, when the content images are part of a video sequence, the image processing system 110 generates noisy versions of the frames of the video sequence, and generates the stylized video by applying the computer models to the noisy frames. Given a noise mask applied in a current frame, the image processing system 110 may adjust the noise mask applied in a subsequent frame based on movement of the client device 116 from the current frame to the subsequent frame. This allows the image processing system 110 to apply same patterns of the noise mask to portions of the current frame and the subsequent frame that include overlapping regions of the scene, in particular portions of the frame that are characterized as flat regions. Consequently, the image processing system 110 can generate a stylized video with reduced artifacts, and can also stylize the frames of the video in a consistent manner since the patterns of the noise mask track the scene itself. In one embodiment, the noise mask may be adjusted by applying one or more geometric transformations (e.g., translation, rotation, reflection) to pixel values of the noise mask.

For example, a user may capture a video of a room with a flat region corresponding to a smooth wall, in which the user rotates the camera around the room. The image processing system 110 may stylize a frame in the video sequence by applying a noise mask, and applying the image transformation models to the current frame. When the camera has been rotated 5 degrees to the left in a subsequent frame, pixel values of the noise mask for the subsequent frame may be translated 5 degrees to the right, such that same patterns of the noise mask are applied to portions of the current frame and portions of the subsequent frame that include overlapping views of the dark wall.

Image Processing System

Figure 2:
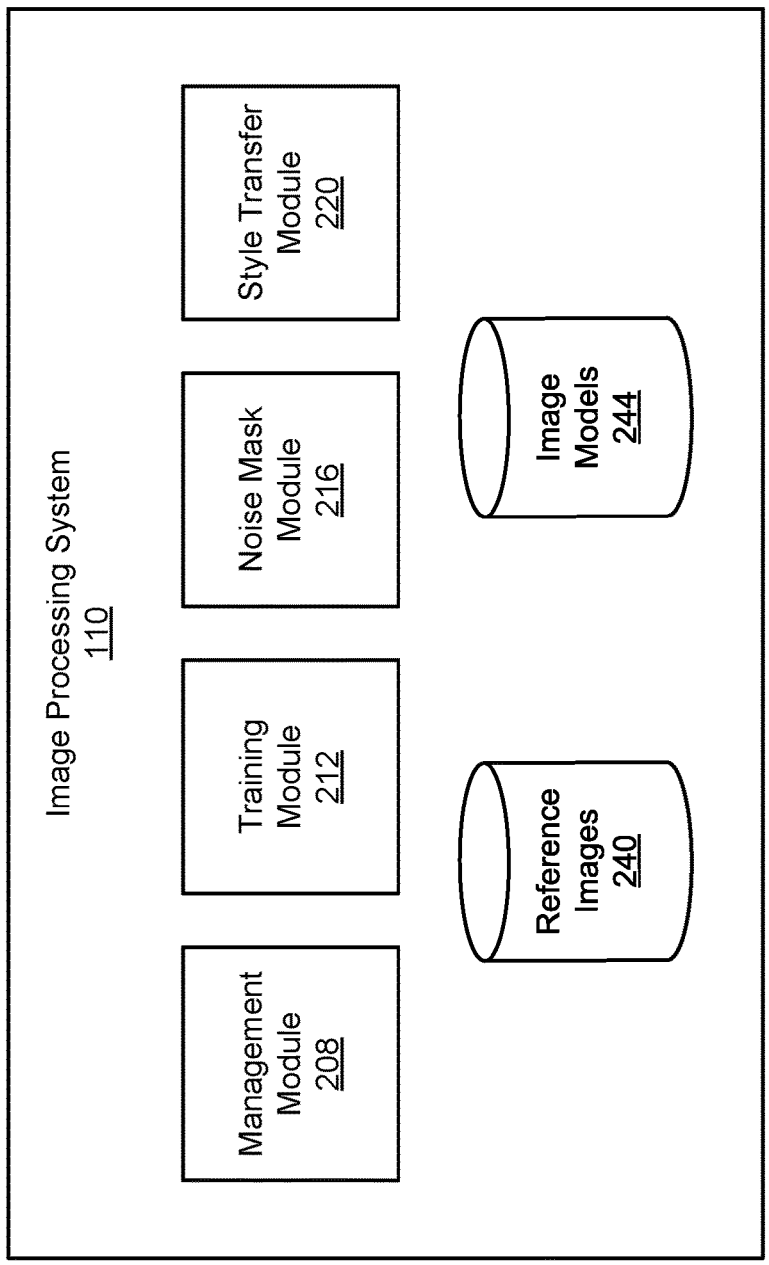
FIG. 2 is an example block diagram of an architecture of an image processing system, in accordance with an embodiment.

FIG. 2 is an example block diagram of an architecture of the image processing system 110, in accordance with an embodiment. The image processing system 110 shown in FIG. 2 includes a management module 208, training module 212, a noise mask module 216, and a style transfer module 220. The image processing system 110 also includes reference images 240 and image transformation models 244. In other embodiments, the image processing system 110 may include additional, fewer, or different components for various applications. Conventional components such as network interfaces, security functions, load balancers, failover servers, management and network operations consoles, and the like are not shown so as to not obscure the details of the system architecture.

The reference image store 240 stores a set of reference images. The reference images may also be provided by users of client devices 116. In one embodiment, the image processing system 110 organizes reference images according to stylistic characteristics such as artist, genre, and the like. For example, reference images that are painted by the same artist (e.g., Vincent van Gogh) or that are associated with the same genre ("Impressionism") can be grouped together.

The management module 208 receives and manages requests from users of client devices 116 for image stylization. Each request includes at least one content image and a request to transform the content image in the style of one or more reference images. In one embodiment, a request includes content images and a reference image desired by the user of the client device 116. In another embodiment, the management module 208 can display a set of predetermined reference images stored in the reference image store 240, in which stylization based on these images are already supported by the image processing system 110. In such an instance, a request can include content images and a selection of one or more reference images. In yet another embodiment, the management module 208 can display a set of categories, such as artists and genres, each associated with one or more reference images. Thus, stylistic features can also be learned from a collection of reference images as a whole, in addition to individual reference images themselves.

The training module 212 trains image transformation models for recomposing content images in the style of one or more reference images. In one particular embodiment referred throughout the remainder of the specification, the image transformation models are neural network models such as convolutional neural networks (CNN), deep neural networks (DNN), recurrent neural networks (RNN), deep residual convolutional neural networks, and the like.

In one embodiment, the training module 212 trains a set of image transformation models that are each associated with one or more reference images. When applied to a content image, each image transformation model recomposes the content image in the style of the one or more reference images associated with the model. For example, the training module 212 may train an image transformation model that generates stylized images incorporating the stylistic features of "Water Lilies" by Claude Monet, another model that generates images incorporating the stylistic features of "The Starry Night" by Vincent van Gogh.

Specifically, for each image transformation model, the training module 212 constructs a training data set including a reference image associated with the model and a set of training images. In one embodiment, the image transformation model $f_W(\cdot)$ for a reference image is a neural network model with a set of weights W, in which the values of the weights are determined by minimizing a loss function. The loss function includes a content loss $l_c$ that relates to how well the content of an output image generated by applying the image transformation model to the training image matches that of the training image. The loss function also includes a style loss $l_s$ that relates to how well the output image matches the style of the reference image. The training module 212 determines the set of weights W such that the output image minimizes a combination of the content loss $l_c$ and the style loss $l_s$. In this manner, the image transformation model generates stylized output images that preserve high-level spatial structures of the training images, while incorporating stylistic features of the reference image.

In one embodiment, the training module 212 may solve the following optimization problem:

$$\arg\min_{W} E[\lambda_c \cdot \ell_c(f_W(x), y_c) + \lambda_s \cdot \ell_s(f_W(x), y_s)]$$

where $x=y_c$ denotes the training image, $y_s$ denotes the reference image, $f_W(x)$ denotes the output of the image transformation model when applied to a training image x, to determine optimal values for the weights W of the image transformation model. $\lambda_c$ denotes the relative weight of the content loss, and $\lambda_s$ denotes the relative weight of the style loss. The expectation is taken over instances of the training data set and minimization may be performed using any optimization algorithm, such as stochastic gradient descent.

In one embodiment, for each iteration of the optimization algorithm, the content loss between the output image $f_W(x)$ and the training image $y_c$ is calculated by applying a pre-trained loss network model to the output image $f_W(x)$ and the training image $y_c$. Specifically, the content loss is a function of the difference between spatial features of the output image $f_W(x)$ and the training image $y_c$ extracted by the loss network model. The style loss between the output image $f_W(x)$ and the reference image $y_s$ is calculated by applying the pre-trained loss network model to the output image $f_W(x)$ and the reference image $y_s$. Specifically, the style loss is a function of the difference between stylistic features of the output image $f_W(x)$ and the reference image $y_s$ extracted by the loss network model. The loss network model may be any pre-trained network model for image classification. For example, the loss network model may be a convolutional deep neural network model pre-trained for image classification tasks.

Figure 3:
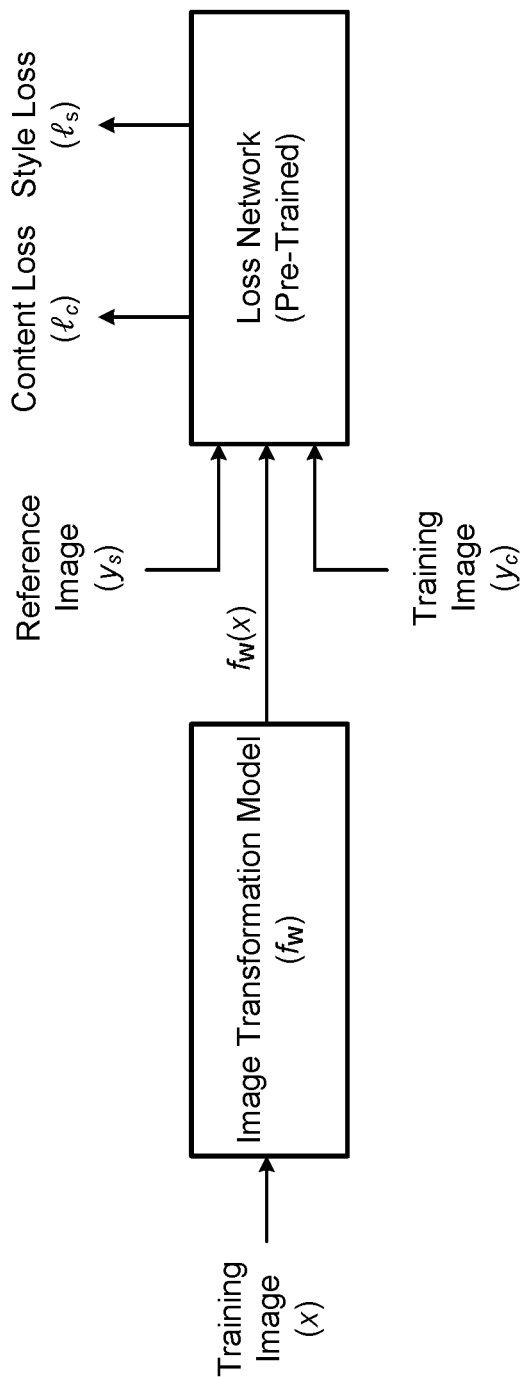
FIG. 3 illustrates an example process for training an image transformation model, in accordance with an embodiment.

FIG. 3 illustrates an example process for training an image transformation model, in accordance with an embodiment. As shown in FIG. 3, for each iteration of the optimization algorithm, the output fw(x) of applying the image transformation model on the training image x is generated based on the current estimate for W. The content loss $l_c$ is generated by applying the loss network to the training image $y_c$ and the output image fw(x). The style loss $l_s$ is generated by applying the loss network to the reference image $y_s$ and the output image fw(x).

Returning to FIG. 2, in one embodiment, the training module 212 may down sample the output image fw(x) and/or the training image $y_c$ when applying the loss network model to calculate the loss function. In one instance, the output image fw(x) and/or the training image $y_c$ is down sampled by one half (½) of the resolution of the original image. Down sampling increases the receptive field of the loss network model, and thus, allows the training module 212 to perform training in a faster time frame, and in a more computationally efficient manner.

The training module 212 stores the image transformation models in the image models store 244.

The noise mask module 216 generates and applies noise masks to content images of received requests. The noise masks are an array of pixels that each have a random value sampled from a probability distribution. In one particular embodiment referred throughout the remainder of the specification, the noise masks are of the same dimensionality (i.e., same number of pixels) as the content images, and include pixel values that are sampled from a Gaussian distribution. Thus, pixel values of the noise mask may have a one-to-one location correspondence with pixel values of the content images due to the same dimensionality.

The noise mask module 216 generates a noise mask for a content image in a client request, and applies the noise mask to the content image. The noise mask can be applied by, for example, summing each pixel value of the noise mask with a corresponding pixel value of the content image. For example, the noise mask module 216 may sum a pixel located at the second row and the first column of the content image having a greyscale intensity value of 240 with a pixel located at the same location of the noise mask having a randomly sampled value of 0.9. The corresponding pixel in the resulting noisy version of the content image may have a value of 240.9.

When the content images are part of a video sequence, the noise mask module 216 generates and applies noise masks to frames of the video sequence. In one embodiment, the noise mask module 216 may apply the same noise mask to one or more frames of the video sequence. In another embodiment, the noise mask module 216 generates a noise mask for a current frame and generates a noise mask for a subsequent frame by adjusting the pixel values of the noise mask for the current frame based on movement of the client device 116 from the current frame to the subsequent frame.

Specifically, the noise mask module 216 may apply geometric transformations to the pixel values of the noise mask such that the patterns of the noise mask track the movement of the client device 116 from the current frame to the subsequent frame, and thus, are fixed to regions of the scene itself. In this manner, the noise mask module 216 applies the same noise mask pattern to a portion of the current frame and a portion of the subsequent frame that include overlapping regions of the scene, especially regions characterized as flat regions. In one embodiment, the noise mask module 216 may perform geometric transformations such as translation, rotation, warping, reflection, and the like, to pixels of the noise mask. For example, when the camera has rotated 10 degrees upward from the current frame to the subsequent frame, the noise mask module 216 may translate pixels of the noise mask 10 degrees downward such that the same noise patterns are applied to portions of the frames corresponding to the same part of a wall in the scene.

In one embodiment, the noise mask module 216 estimates the movement of the client device 116 between frames based on measurements received from one or more sensors of the client device 116. In one instance, the sensors may be gyroscopes included in the client device 116 that measure rotations of the client device 116 with reference to one or more axes. In another embodiment, the noise mask module 216 may analyze the homography between the current frame and the subsequent frame to estimate the movement of the client device 116 between two frames. For example, rotation or translation of the camera may be estimated from a homography matrix based on analysis of the frames. The noise mask module 216 may then use the estimated movement to adjust the noise mask for subsequent frames.

The style transfer module 220 constructs stylized images for image stylization requests provided by the management module 208. In one embodiment, the style transfer module 220 identifies the image transformation model associated with the reference image of the request, and applies the identified image transformation model to the noisy content images of the request, as generated by the noise mask module 216. Since the noise mask is applied to the content images, including any flat regions in the images, the style transfer module 220 can generate stylized images with reduced artifacts. Specifically, when the content images are part of a video sequence, the style transfer module 220 can generate a stylized video with reduced artifacts in a consistent manner when the noise patterns track movement of the client device 116.

Methods

Figure 4:
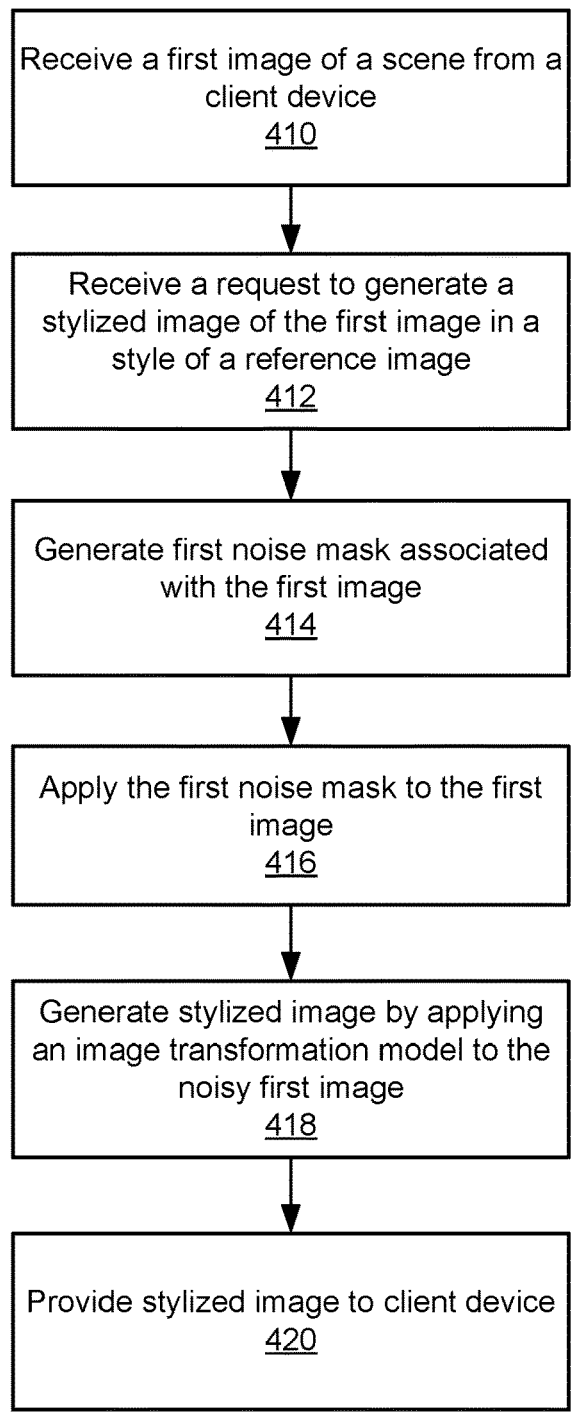
FIG. 4 is a flowchart illustrating a process of transforming images in the style of a reference image, in accordance with an embodiment.

FIG. 4 is a flowchart illustrating a process of transforming images in the style of a reference image, in accordance with an embodiment.

The image processing system receives 410 a first image of a scene from a client device. The system also receives 412 a request to generate a stylized image of the first image in the style of a reference image. The system generates 414 a first noise mask associated with the first image. The first noise mask is applied 416 to the first image to generate a noisy version of the first image. The system generates 418 the stylized image by applying an image transformation model to the noisy version of the first image. The stylized image is provided 420 to the client device.

Figure 5:
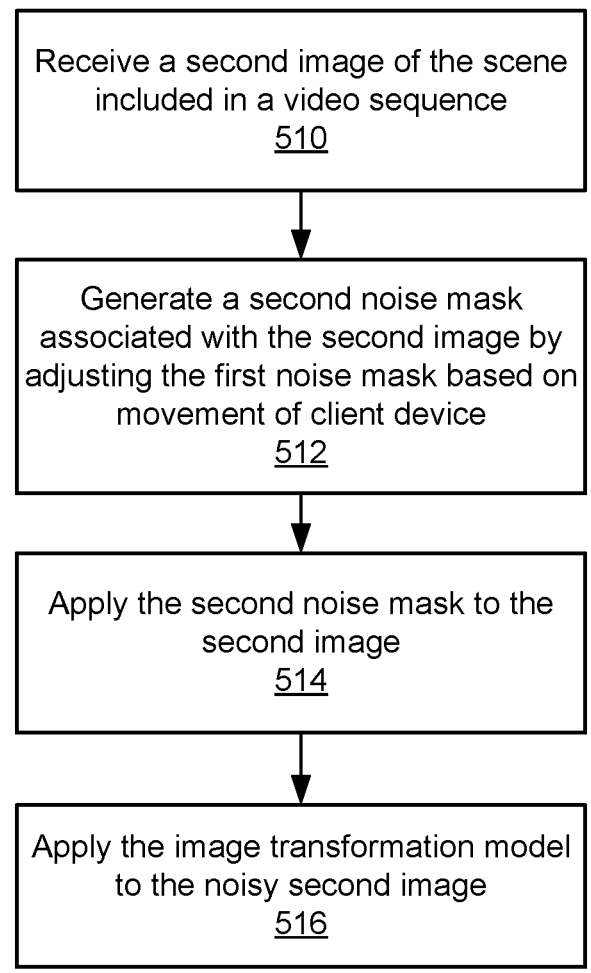
FIG. 5 is a flowchart illustrating a process of transforming video sequences in the style of a reference image, in accordance with an embodiment.

FIG. 5 is a flowchart illustrating a process of transforming video sequences in the style of a reference image, in accordance with an embodiment.

The image processing system receives 510 a second image of the scene that is included in the video sequence. The system generates 512 a second noise mask associated with the second image by adjusting the first noise mask based on movement of the client device from the first image to the second image. The second noise mask is applied 514 to the second image to generate a noisy version of the second image. The system applies 516 the image transformation model to the noisy version of the second image.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving, from a client device, a first image of a scene;
    receiving, from the device, a request to stylize the first image in a style of a reference image to generate a stylized image;
    generating a first noise mask associated with the first image;
    applying the first noise mask to the first image to generate a noisy version of the first image;
    generating the stylized image by applying an image transformation model to the noisy version of the first image, where the image transformation model combines stylistic features of the reference image with spatial content of the first image, and wherein the image transformation model is a neural network model; and
    providing the stylized image to the client device.

2. The method of claim 1, wherein the first noise mask includes an array of pixel values randomly sampled from a Gaussian probability distribution.

3. The method of claim 1, wherein the image transformation model is a deep convolutional neural network model.

4. The method of claim 1, wherein parameters of the image transformation model are trained using the reference image.

5. The method of claim 4, wherein the parameters of the image transformation model are trained by at least applying a loss network model to the reference image.

6. The method of claim 1, wherein the first image is included in a video sequence, and the method further comprising:
    receiving, from the client device, a second image of the scene included in the video sequence;
    generating a second noise mask associated with the second image, the second noise mask generated by adjusting the first noise mask based on movement measurements of the client device from the first image to the second image; and
    applying the second noise mask to the second image to generate a noisy version of the second image.

7. The method of claim 6, wherein the movement measurements of the client device are generated by a gyroscope sensor in the client device.

8. The method of claim 6, wherein the movement measurements of the client device are estimated by analyzing a homography between the first image and the second image.

9. The method of claim 6, wherein a same noise mask pattern is applied to a portion of the first image and a portion of the second image that include partially overlapping regions of the scene.

10. The method of claim 6, wherein adjusting the first noise mask comprises applying one or more geometric transformations to pixel values of the first noise mask.

11. The method of claim 1, wherein receiving the request to stylize the first image comprises receiving the reference image from the client device.

12. A method comprising:
    receiving a request to stylize a first image in a style of a reference image to generate a stylized image;
    querying a database of image transformation models to identify an image transformation model associated with the reference image, where the image transformation model is generated by:
        generating an output image by applying the image transformation model to a training image,
        generating a down sampled version of the output image,
        applying a loss network model to the reference image, the training image, and the down sampled version of the output image to generate a loss function, and
        determining a set of weights for the image transformation model based on the generated loss function; and
    generating the stylized image by applying the image transformation model to the first image.

13. The method of claim 12, further comprising generating a down sampled version of the training image, and wherein applying the loss network model to the training image comprises applying the loss network model to the down sampled version of the training image.

14. The method of claim 12, wherein applying the loss network model to generate the loss function comprises:
  generating a content loss representing difference between spatial features of the training image and the output image;
  generating a style loss representing difference between stylistic features of the output image and the reference image; and
  combining the content loss and the style loss to generate the loss function.

* * * * *